(12) United States Patent
Schultz et al.

(10) Patent No.: US 8,020,659 B2
(45) Date of Patent: Sep. 20, 2011

(54) HYDROSTATICALLY DRIVEN VEHICLE AND METHOD THEREFOR

(75) Inventors: Eric J Schultz, Washington, IL (US); John Marsolek, Watertown, MN (US); Corwin E. Storer, Bartonville, IL (US)

(73) Assignee: Caterpillar Paving Products Inc., Minneapolis, MN (US)

( * ) Notice: Subject to any disclaimer, the term of this patent is extended or adjusted under 35 U.S.C. 154(b) by 905 days.

(21) Appl. No.: 11/946,677

(22) Filed: Nov. 28, 2007

(65) Prior Publication Data

US 2009/0133951 A1 May 28, 2009

(51) Int. Cl.
*B60K 17/10* (2006.01)

(52) U.S. Cl. ........ 180/301; 180/302; 180/305; 180/307; 60/399; 60/406; 60/436; 701/1; 701/50; 701/70

(58) Field of Classification Search ................ 701/1, 50, 701/70; 60/399, 406, 436, 442–444; 180/301, 180/302, 305, 307

See application file for complete search history.

(56) References Cited

U.S. PATENT DOCUMENTS

| | | | |
|---|---|---|---|
| 4,191,270 A | 3/1980 | Monteith | |
| 4,194,362 A | 3/1980 | Nonnenmacher | |
| 4,364,230 A | 12/1982 | Holmes | |
| 4,402,181 A * | 9/1983 | Acker et al. | 60/427 |
| 4,530,416 A * | 7/1985 | Kassai | 180/307 |
| 4,566,274 A * | 1/1986 | Heiser et al. | 60/444 |
| 4,818,139 A * | 4/1989 | Brock et al. | 404/81 |
| 5,015,120 A * | 5/1991 | Brock et al. | 404/108 |
| 5,199,525 A * | 4/1993 | Schueler | 180/242 |
| 5,240,366 A * | 8/1993 | Bamford | 414/686 |
| 5,251,440 A | 10/1993 | Bong-dong et al. | |
| 6,198,988 B1 * | 3/2001 | Tseng | 701/1 |
| 6,321,866 B1 * | 11/2001 | Prohaska | 180/307 |
| 6,471,619 B2 * | 10/2002 | Nanri et al. | 477/52 |
| 6,558,072 B2 * | 5/2003 | Staffenhagen et al. | 404/117 |
| 6,584,710 B1 * | 7/2003 | Lin et al. | 37/348 |
| 6,650,985 B2 * | 11/2003 | Lin et al. | 701/50 |
| 6,655,233 B2 * | 12/2003 | Evans et al. | 74/731.1 |
| 6,684,635 B2 * | 2/2004 | Franz | 60/448 |
| 6,811,509 B1 * | 11/2004 | Langenfeld et al. | 475/83 |
| 7,082,358 B2 * | 7/2006 | Sugo | 701/33 |
| 7,096,107 B2 * | 8/2006 | Michi et al. | 701/70 |
| 7,246,670 B2 * | 7/2007 | Hayashi et al. | 180/6.2 |

(Continued)

FOREIGN PATENT DOCUMENTS

EP 1350990 10/2003

(Continued)

*Primary Examiner* — J. Allen Shriver, II
*Assistant Examiner* — James Triggs
(74) *Attorney, Agent, or Firm* — Leydig, Voit & Mayer

(57) ABSTRACT

A hydrostatically driven vehicle has an engine operating a variable displacement propel pump, a displacement of which can vary based on an angle of a rotating swashplate, such that a fluid flow impelled by the pump transfers power to at least one propel motor rotating a wheel of the vehicle. An electronic controller of the vehicle senses an operating parameter of the system, for example, the angle of the rotating swashplate or the direction and speed of rotation of the propel motor with a sensor to yield an actual signal, and relays the actual signal to an electronic controller. The controller determines a desired angle for the rotating swashplate based on the control signal, and compares it to the actual signal from the sensor. Motion of the vehicle is stalled when the angle signal differs from the desired angle by a predetermined extent and for a predetermined period.

13 Claims, 5 Drawing Sheets

U.S. PATENT DOCUMENTS

| | | |
|---|---|---|
| 7,376,499 B2 * | 5/2008 | Salman et al. .................. 701/34 |
| 7,797,915 B1 * | 9/2010 | Kallara et al. ............. 56/10.2 R |
| 7,835,839 B2 * | 11/2010 | Hori et al. ....................... 701/51 |
| 2001/0036881 A1 | 11/2001 | Nanri et al. |
| 2003/0010152 A1 * | 1/2003 | Evans et al. .................. 74/730.1 |
| 2003/0122329 A1 * | 7/2003 | Lin et al. ..................... 280/6.15 |
| 2003/0154715 A1 * | 8/2003 | Schuh ............................. 60/487 |
| 2003/0205044 A1 * | 11/2003 | Franz ............................. 60/445 |
| 2004/0209718 A1 | 10/2004 | Ishibashi et al. |
| 2005/0014603 A1 * | 1/2005 | Brome et al. ................... 477/38 |
| 2005/0084387 A1 * | 4/2005 | Klocke ........................ 417/221 |
| 2006/0150624 A1 * | 7/2006 | Shah ............................... 60/445 |
| 2007/0130938 A1 * | 6/2007 | Burgart et al. ................. 60/487 |

FOREIGN PATENT DOCUMENTS

| | | |
|---|---|---|
| JP | 61-037540 A | 2/1986 |
| JP | 2000170908 | 6/2000 |
| JP | 2004301264 | 10/2004 |

* cited by examiner

HYDROSTATICALLY DRIVEN VEHICLE AND METHOD THEREFOR

TECHNICAL FIELD

This patent disclosure relates generally to hydrostatically driven vehicles and, more particularly, to diagnostic systems and controls monitoring operation of hydraulic circuits operating to propel said type of vehicles.

BACKGROUND

Hydrostatically driven vehicles typically include a hydraulic pump driven by an engine or motor. The hydraulic pump propels a flow of fluid to one or more actuators, typically hydraulic motors, connected to wheels or other driving features of the vehicle. The flow of fluid from the pump passes through each actuator, causing the vehicle to move along at a travel speed. An operator adjusting a control input, for example, a lever, pedal, or any other appropriate device controls motion of the vehicle. When the operator displaces the control input, a signal is generated by a displacement sensor integrated with the control input or, alternatively, by displacement of a mechanical linkage. The signal is conveyed to a controller associated with the vehicle, where it is interpreted and an appropriate command is issued to an actuator associated with the hydraulic pump, the actuator being arranged to move a control arm of the pump operating to change the displacement of the pump. Alternatively, the control input may be mechanically connected to the pump, for example, by cable, which causes the control arm of the pump to move in response to displacement of the control input.

Displacement of the control arm of the pump causes a change in the pump's displacement by changing the angle of operation of a swashplate within the pump and, accordingly, a change in the pressure and flow rate of fluid propelled through the pump. Modulation of the flow rate of fluid through the pump controls, for example, the rate of rotation of hydraulic motors driving the wheels of the vehicle and, therefore, the travel speed of the vehicle. Additional systems may be available for control of the travel speed of the vehicle, for example, braking systems or transmissions may be used to decelerate the vehicle when the operator so desires.

Even though these types of control have been effective in the past, they are inadequate in preventing uncommanded motion of the vehicle under some circumstances, for example, when heavy vehicles, such as asphalt compactors, are operating on graded surfaces or inclines. Preventing uncommanded motion of the vehicle is desirable not only for safety concerns, but also because operation of the vehicle at a faster or slower than desired pace will directly affect operating parameters, such as, the efficiency and rate of compaction of material.

SUMMARY

The disclosure describes, in one aspect, a hydrostatically driven vehicle having at least one wheel and a variable displacement pump. The displacement of the pump is adjustable based on variation of an angle of a rotating swashplate. Fluid flow impelled by the pump circulates to at least one propel motor rotating one or more wheels of the vehicle. A sensor senses the angle of the rotating swashplate, which is relayed to an electronic controller. Alternatively, a sensor senses the direction and speed of rotation of the propel motor. The controller determines a desired signal for the rotating swashplate based on a control signal from the operator, compares it to the actual signal from the sensor and to a threshold, and arrests motion of the vehicle when the actual signal differs from the desired signal by a predetermined extent and for a predetermined period.

In another aspect, this disclosure describes a method for operating a hydrostatically driven vehicle having a variable displacement pump operably associated with a propel motor driving at least one wheel. The method includes receiving a command from an operator within an electronic controller associated with the vehicle and correlating the command to a desired angle of operation for the swashplate included in the variable displacement pump. A sensor yielding a measurement relayed to the electronic controller measures the angle of operation of the swashplate or, alternatively, the direction and speed of rotation of the propel motor. The measurement is compared to the desired angle to yield a difference, and the difference is compared to a threshold. Under a first operating mode, when the difference is below the threshold, the angle of operation of the swashplate is appropriately adjusted to decrease the difference or, alternatively, to directly command a position of the pump. In a second operating mode, when the difference is above the threshold, a timer counting a time value is initiated and incremented while the difference is above the threshold. When the time value exceeds a time limit, motion of the vehicle is presumed to be uncommanded and is, accordingly, arrested or stalled.

In yet another aspect, this disclosure generally describes a method of operating a hydrostatically driven vehicle having a prime mover operating a variable displacement propel pump. Displacement of the pump is varied based on an angle of a rotating swashplate included in the pump. A fluid flow impelled by the pump operates to transfer power to at least one propel motor, the propel motor operably connected to at least one wheel of the vehicle. Motion of the vehicle is controlled by a control operated by a user. In accordance with the method, the angle of the rotating swashplate is sensed with a sensor to yield an angle signal, which is relayed to an electronic controller. Alternatively, the direction and speed of rotation of the propel motor is measured, and the measurement is relayed to the electronic controller. A desired angle for the rotating swashplate may be determined based on the control signal and compared to the desired or expected mode of operation. Thereafter, motion of the at least one wheel of the vehicle may be stalled when the measurement differs from the desired angle by a predetermined extent and for a predetermined period.

DETAILED DESCRIPTION

This disclosure relates to hydrostatically driven vehicles and, more specifically, vehicles having hydraulic systems associated therewith for effecting and controlling motion of the vehicle. Each system includes at least one electronic controller arranged to monitor and dictate the function of various actuators such that uncommanded motion of the vehicle is avoided. The embodiment described herein draws on the systems associated with an asphalt compactor for illustration by way of example only, although the disclosure is applicable to any other type of hydrostatically driven vehicle. Therefore, the examples set forth herein should not be construed as limiting based on the specific vehicle described in association therewith, but should be construed as applicable to any other vehicle, for example, skid steer vehicles, wheeled vehicles and loaders, graders, tracked vehicles, on and off highway trucks and tractors, and so forth.

Figure 1:
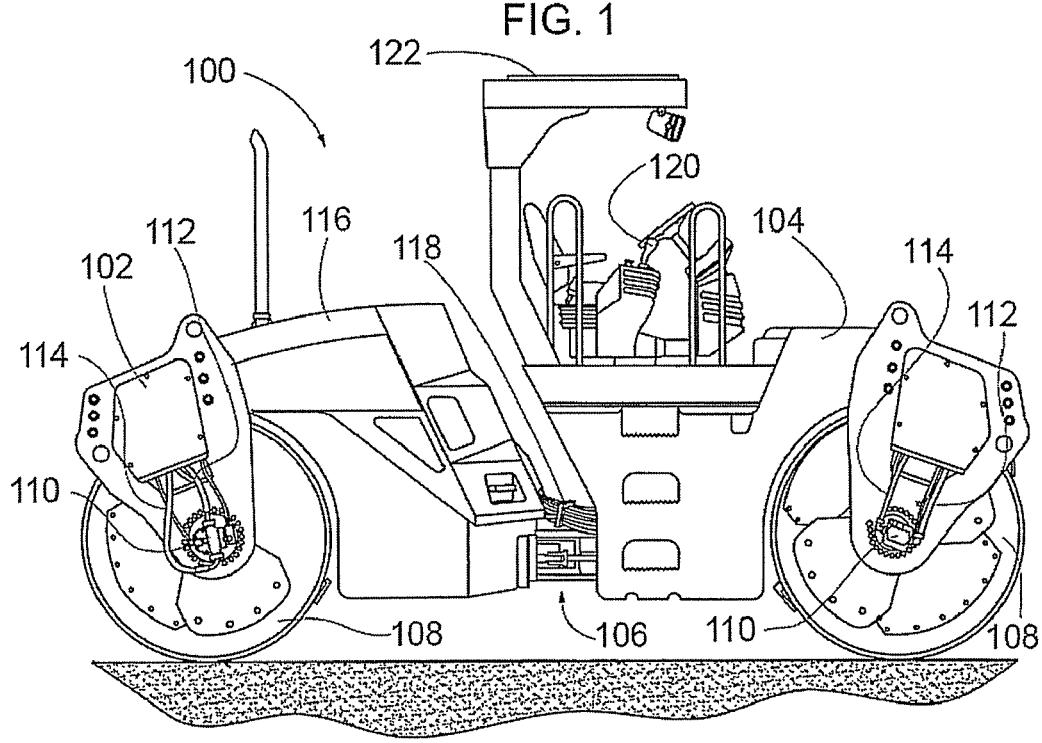
FIG. 1 is an outline view of one example of a hydrostatically driven vehicle.

A side view of an asphalt compactor 100 is shown in FIG. 1. The compactor is presented as an example of a vehicle 100 that includes an engine frame 102 and a non-engine frame 104 connected to each other by an articulated joint 106. The joint 106 allows pivoting motion between the frames 102 and 104 to permit steering of the vehicle 100. Each frame 102 and 104 includes one or more wheels, here in the form of a roller or drum 108 rotatably mounted thereto. While this disclosure refers to rollers 108, the disclosure is applicable to wheels of wheeled vehicles in the broader sense. Each roller 108 contacts the supporting surface and supports the vehicle 100 permitting it to travel along the surface. Each roller 108 is capable of powered rotation by way of a hydraulic motor 110 arranged to receive a flow of fluid from either a first line or conduit 112 or a second line or conduit 114. Each motor 110 can operate its respective roller 108 in either direction depending on the direction of flow through the first or second conduit 112 and 114.

Flow of fluid through the first and second conduits 112 and 114 is driven by a pump (not visible in FIG. 1) operated by an engine 116. The engine 116 and pump are mounted onto the engine frame 102 and are part of a hydraulic system extending throughout the vehicle. Intermediate lines or conduits 118 connect the engine frame 102 with the non-engine frame 104 for communication of hydraulic fluid therebetween. The pump is a variable displacement pump, the displacement of which is controlled by a control input or lever 120. The control lever 120 is positioned within a cab portion 122 of the vehicle 100 arranged to accommodate an operator during service.

Figure 2:
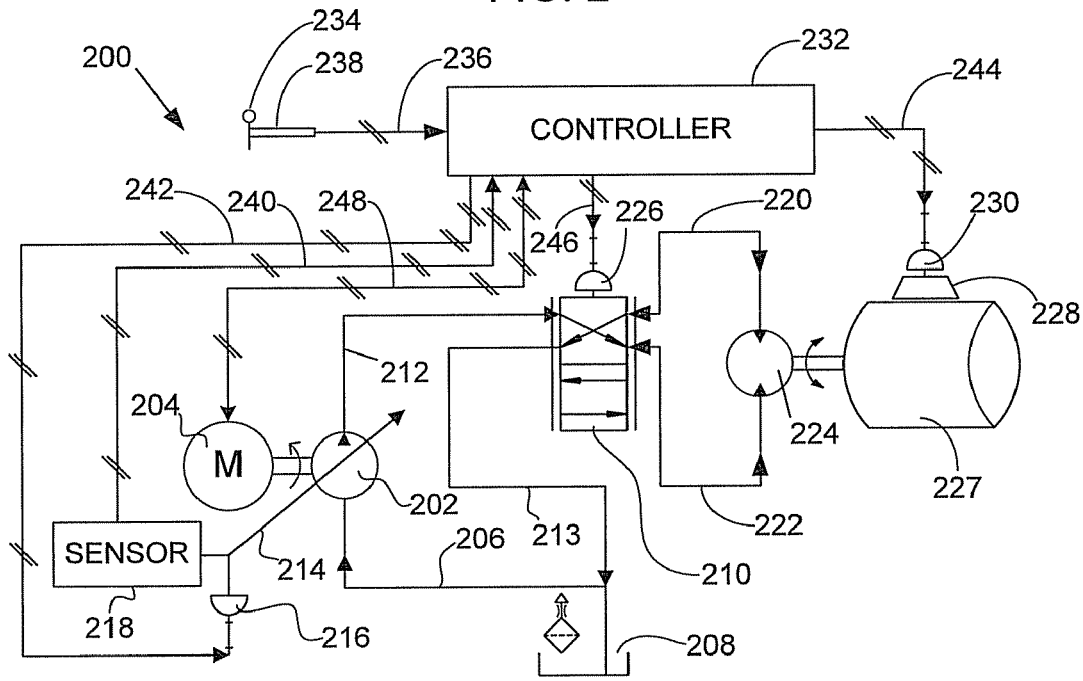
FIG. 2 is a circuit diagram for a simplified hydraulic circuit in accordance with the disclosure.

A simplified circuit diagram for a hydraulic system 200 including electrical controls is shown in FIG. 2. The system 200, shown simplified for purposes of illustration, includes a portion of the drive circuit for driving one of the drums 108 of the vehicle 100. As can be appreciated, hydraulic components and connections to drive the second drum 108, or vibrators (not shown) within each drum 108 are not shown for the sake of simplicity. Similar hydraulic components and connections may be provided in alternate hydrostatically driven vehicles to perform operations such as, by way of example only, lifting and/or tilting of attached implements.

The hydraulic system 200 includes a variable displacement pump 202 connected to a prime mover, in this case, the engine 204 of the vehicle. The pump 202 has an inlet conduit 206 connected to a vented reservoir or drain 208. When the engine 204 is operating, the pump 202 draws a flow of fluid from the reservoir 208 that it pressurizes before sending it to a four-port two-way (4-2) valve 210 via a supply line or conduit 212. A drain port of the valve 210 is connected via a drain passage 213, which drains to the reservoir 208. A control lever 214 is connected to a swashplate (not shown) internal to the pump 202 and arranged to change the angle of the swashplate in response to motion of control lever 214. Motion of the control lever 214 is accomplished by an actuator 216 connected to the control lever 214. The displacement or angle of the control lever 214, which is equivalent to the angle of the swashplate of the pump 202, may be sensed or measured with a sensor 218. The sensor 218 may be, for example, an analog or digital sensor measuring the angle (or, equivalently, the displacement) of the control lever 214 and, hence, the position of the swashplate within the pump 202.

As can be appreciated, the pump 202 functions to propel a flow of fluid through the supply line 212 when the engine 204 operates. Depending on the position of the 4-2 valve 210, the flow of fluid from the supply line 212 is routed into one of two conduits, a first conduit 220 and a second conduit 222, which are respectively connected to either side of a hydraulic motor 224. The position of the 4-2 valve 210 is controlled by a valve actuator 226 disposed to reciprocally move the 4-2 valve 210 between two positions causing the motor 224 to move in the desired direction. The motor 224 is connected to a wheel or drum 227 of the vehicle and arranged to rotate the drum 227 when the vehicle is travelling. A brake 228, shown schematically, is arranged to arrest or stall motion of the drum 227 when actuated by an actuator 230. The brake actuator 230 shown in this embodiment is electronic and actuates the brake 228 causing friction to arrest motion of the drum 227, but other configurations may be used. For example, a pin may be inserted into an opening of a rotating disk connected to the drum 227 such that motion of the disk and drum 227 with respect to the pin is stalled, and so forth. Further, the brake 228 is shown external to the drum 227 for illustration, but more conventional designs such as those having the brake 228 protected within the drum 227 may be utilized.

An electronic controller 232 is connected to the vehicle and arranged to receive information from various sensors on the vehicle, process that information, and issue commands to various actuators within the system during operation. Connections pertinent to the present description are shown but, as can be appreciated, a great number of other connections may be present relative to the controller 232. In this embodiment, the controller 232 is connected to a control input 234 via a control signal line 236. The control input 234, shown schematically, may be, for example, a lever moveable by the operator of the vehicle used to set a desired speed setting for the vehicle. The position of the control input 234 may be translated to a command signal through a sensor 238 associated with the control input 234. The control signal relayed to the controller 232 may be used in a calculation, along with other parameters, for example, the speed of the engine 204, the temperature of fluid within the reservoir 208, and so forth, to yield a desired angle or signal for the swashplate that causes the vehicle to move at the desired speed.

The sensor 218 is appropriately connected to the controller 232 via a pump setting feedback line 240 and arranged to receive a position or actual signal from the sensor 218 indicative of the position, setting, or angle of the swashplate within the pump 202. The controller 232 is also arranged to issue commands operating the various actuators in the system 200. For example, a pump displacement command line 242 may connect the controller 232 with the actuator 216 operating the control lever 214. Similarly, a brake activation line 244 may connect the controller 232 with the brake actuator 230 such that, in the presence of an appropriate signal in the brake activation line 244, the brake 228 may be engaged to arrest or stall motion of the drum 227 relative to the vehicle. Further, a control line 246 may connect the controller 232 with the valve actuator 226 such that the direction of rotation and, therefore, travel of the vehicle may be dictated by an operator based on the position of the 4-2 valve 210. Typically, the direction of travel of the vehicle depends on the direction of displacement of the control input 234 with respect to a neutral position. Finally, the controller 232 may be arranged to send and receive a multitude of other parameters to and from the engine 204 via a multi-channel engine communication line 248. Such parameters may include, for example, various operating parameters of the engine 204 such as engine speed and fuelling, as well as other parameters relevant to the operational state of the engine 204, such as coolant temperature, oil temperature, air temperature, component fault codes, and so forth.

When the operator commands motion of the vehicle by displacing the control input 234, a command signal is relayed to the controller 232 via the command input line 236. This signal, as is described in further detail below, causes the pump actuator 216 to move the control lever 214 by an appropriate extent to achieve a desired angle. The desired angle of the control lever 214, which translates into a desired setting for the swashplate of the pump 202, causes an appropriate flow of motive fluid through the motor 224, which results in rotation of the drum 227 achieving the desired travel speed of the vehicle.

Even though this drive arrangement works well under most conditions, certain conditions exist under which the vehicle may be prone to motion different from the commanded motion by the operator. When such rare conditions are present, for example, when the vehicle is ascending or descending a steep incline, the drum 227 may begin rotating faster or in the opposite direction than what was commanded by the operator. In such a situation, the motor 224 is acting more like a pump inasmuch as it forces a change in the flow rate or direction for fluid within the first and second conduits 220 and 222. Because of the large weight of the vehicle, this change in flow characteristics may force a change in the position of the 4-2 way valve 210, and may even force the swashplate within the pump 202 to change its angle and accommodate the new and uncommanded flow conditions. When such behavior is exhibited by the vehicle, it is desirable to arrest or stall motion of the vehicle, alert the operator, and allow the operator to regain control. This can be accomplished by an appropriate functionality coded within the controller 232 as described below.

Figure 3:
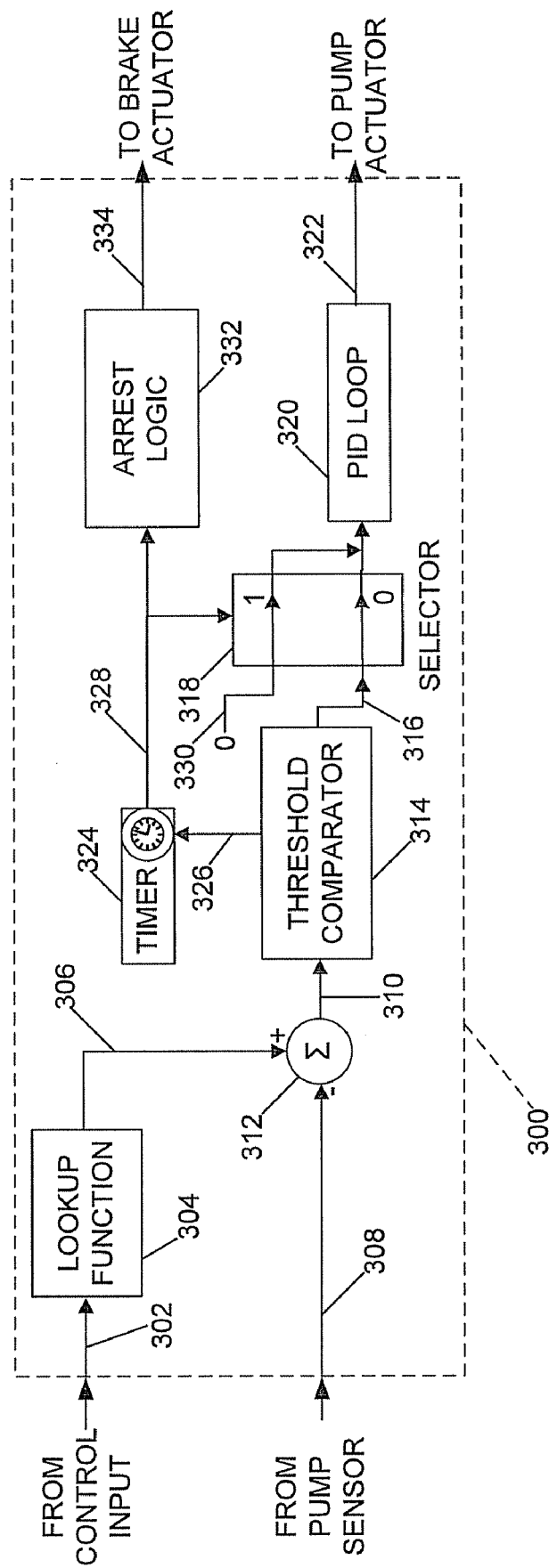
FIG. 3 is a block diagram for a control system in accordance with the disclosure.

A block diagram for a control system 300 capable of detecting and mitigating uncommanded motion of a hydrostatically driven vehicle is shown in FIG. 3. The control system 300, or an equivalent, may advantageously be coded within the controller 232 described in connection with FIG. 2 above, such that an uncommanded motion of the vehicle is identified during operation and arrested, allowing the operator to regain control. The system 300 receives a command 302 for a desired vehicle speed or, equivalently, a desired signal for the pump 202 from a displacement of the control input 234 by the operator. The command 302 may be passed through a lookup function 304 where it may be correlated to a desired angle 306 for the swashplate. Concurrently, a feedback signal 308, for example, a measured or actual angle of the control lever 214 by a sensor 218 integrated with the pump 202, arrives at the controller 232.

The control system 300 may calculate a difference or error 310 between the desired signal 306 and actual signal 308 in a summing block 312, and compare the error to a set of threshold values in a comparator function 314. The error 310 is indicative of the difference between the desired signals 306 and the actual signals 308 of the swashplate within the pump 202, which translates into the difference between the desired and actual speeds of the vehicle. The magnitude of this error is an indication of the discrepancy between the commanded and the actual motion of the vehicle. This error, normally, will be present for a short duration and have a magnitude decreasing with time as the system response tends to match the commands during normal operation.

The threshold comparator 314 may operate continuously during operation to monitor the error between the desired signal 306 and actual signal 308 for abnormal conditions or, in general, for excursions of error values that are indicative of a potential issue. The threshold comparator 314 may continuously compare the magnitude and direction of the error 310 to predetermined constant or variable high and low thresholds. The threshold comparator 314 may operate to either send the error 310 through unaltered, when the error does not exceed the thresholds, or truncate the error 310 to remove temporary spikes, which may occur during sudden changes in commands from the operator. The unaltered or delimited error value 316 exiting the threshold comparator 314 passes through a selector switch 318 before entering a dynamic control algorithm. In the embodiment shown, the dynamic control algorithm is a proportional, integral, and derivative (PID) term control loop 320, but other types of controllers may be used, for example, modeling functions, models, adaptive algorithms, and so forth. The PID loop 320 is capable of calculating and sending adjustments 322 to the pump actuator 216 acting to bring the actual angle of the swashplate of the pump 202 closer to the desired angle.

In situations when the vehicle does not closely follow motion commands, such as, in situations when the vehicle is travelling along a steep slope or when the vehicle is sliding along the support surface such that the desired speed does not match the actual speed, the PID loop may become ineffective in controlling motion of the vehicle. In such situations, it is advantageous to disable the PID loop 320 or any other similar control scheme to prevent "wind-up" in any such controller 232, and disable motion of the vehicle using other methods as described below.

At times during operation when the error exceeds a threshold value, the threshold comparator 314 is arranged to activate a timer 324 through a threshold flag value 326. When the comparator 314 determines the error 310 to be above the threshold, the flag 326 is activated initializing the timer 324, which begins counting the time since the error exceeded the threshold by incrementing a time value. The timer 324 may increment the time value up to a predetermined time while the error is above the threshold and the flag 326 is active. If the error 310 exceeds the threshold for at least the predetermined time, meaning, the flag 326 is active during counting of the time value up to the predetermined time and the predetermined time is reached, the timer 324 will activate a fault flag 328. Activation of the fault flag 328 may be accomplished, for example, by setting the fault flag 328 value from zero to one.

Activation of the fault flag 328 operates to halt motion of the vehicle. For instance, the fault flag 328 causes the selector switch 318 to change its position and route a neutralizing value 330, for example, zero instead of the delimited error 316, into the PID loop 320. Input of the neutralizing value 330 into the PID loop 320 will cause the PID loop 320 to quickly "wind down" and to cease sending commands to the pump, causing the pump to assume a neutral or zero angle position. Simultaneously, the fault flag 328 activates an arresting function 332 that acts to automatically stop the vehicle by either activating the brakes 228 of the vehicle via a braking signal 334 to the brake actuator 230. The fault flag may additionally perform other functions, for example, alert the operator of the emergency condition, sound a buzzer or alarm, shift a transmission to neutral, turn off the engine of the vehicle, and so forth.

Figure 4:
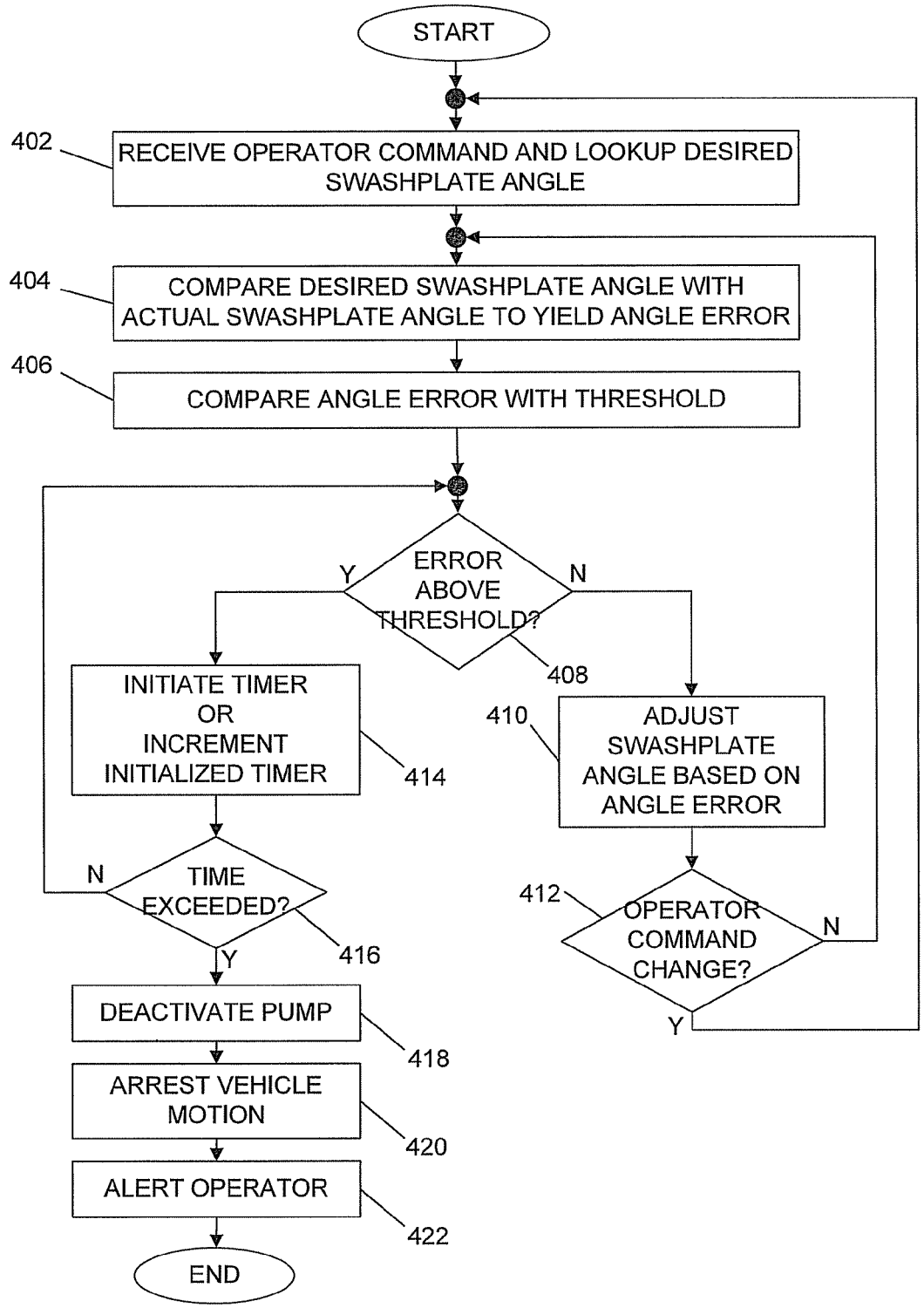
FIG. 4 is a flowchart for a method of operating a hydrostatically driven vehicle in accordance with the disclosure.

A flowchart for an exemplary method of arresting uncommanded motion of a hydrostatically driven vehicle is shown in FIG. 4. A controller 232 integrated with the vehicle may receive an operator command and, based on the command, calculate or interpolate a desired angle for the swashplate of the pump 202 driving the fluid operating the motors 224 of the vehicle at 402. The desired angle, or an equivalent parameter, is compared to an actual angle of the pump 202, as measured by an appropriately positioned sensor 218, to yield a difference or error at 404. The error is compared to a threshold at 406 for a determination at 408 of whether the error exceeds the threshold value.

If the error is determined to be below the threshold at 408, operation continues under a normal or first mode with an adjustment of the swashplate angle at 410. Such adjustment may be provided, for example, by use of a PID loop 320 or other control scheme operating to perform adjustments to the angle based on the difference or error previously calculated at 404. Changes in operator command are determined at 412 and the process repeats starting with the determination of the desired angle at 402 if there are changes in the command or with the comparison at 404 if there are no changes.

If, on the other hand, the error is determined to exceed the threshold at 408, operation continues under a second mode of operation by initiation of the timer 324 at 414. The timer 324 initiated at 414 may be, for example, an incremental timer counting up to a predetermined time threshold or limit. A determination whether the time threshold or limit has been reached at 416 operates to increment the timer as long as the error is still above the threshold at 408. The timer 324 continues to count the time since the error was determined to be above the threshold and while the error is still present. When the timer has reached the time limit at 416, and while the error is still above the threshold at 408, the pump controller is deactivated at 418. Deactivation of the pump controller may be accomplished, for example, by sending a disabling value to a PID loop as described above, motion of the vehicle is arrested or stopped at 420, and the operator is alerted to the presence of a fault condition at 422.

Figure 5:
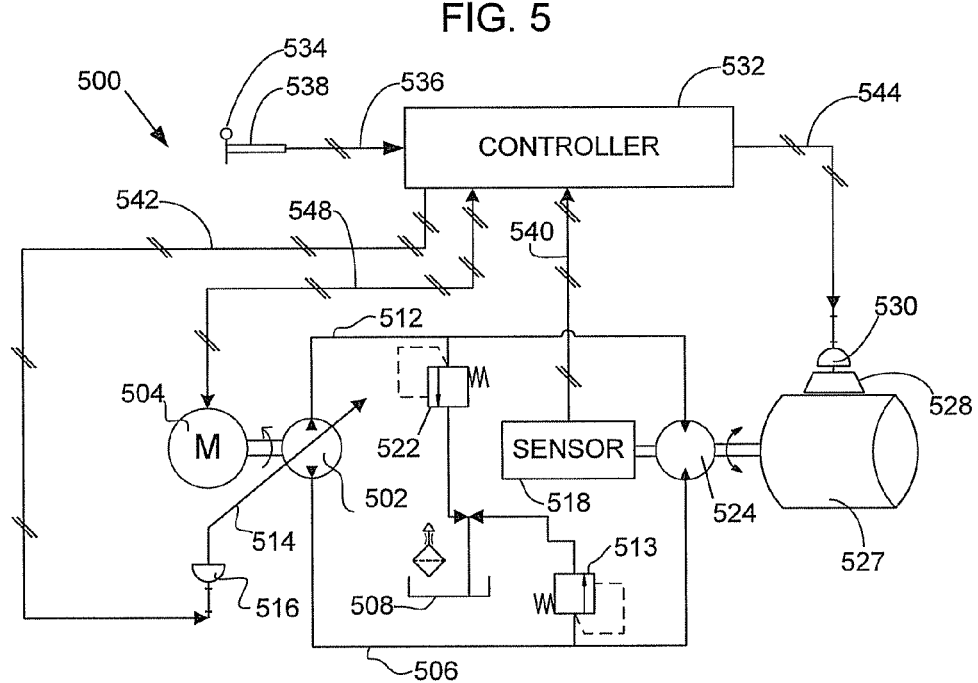
FIG. 5 is a circuit diagram for a simplified hydraulic circuit in accordance with an alternate embodiment of the present disclosure.

A simplified circuit diagram for an alternate embodiment of a hydraulic system 500 including electrical controls is shown in FIG. 5. The system 500, shown simplified for purposes of illustration, includes a portion of the drive circuit for driving one of the drums 108 of the vehicle 100. The hydraulic system 500 includes a variable displacement pump 502 connected to a prime mover, in this case, the engine 504 of the vehicle. The pump 502 is a bidirectional pump that is able to operate a hydraulic motor or another hydraulic device in two directions. When the engine 504 is operating, a control lever 514 connected to a swashplate (not shown) internal to the pump 502 is arranged to change the angle of the swashplate in two directions in response to motion of control lever 514. Motion of the control lever 514 is accomplished by an actuator 516 connected to the control lever 514. The displacement or angle of the control lever 514 controls the direction and flow rate of hydraulic fluid supplied to a bidirectional propel motor 524. The rotational speed and direction of rotation of the propel motor 524 may be sensed or measured with a sensor 518. The sensor 518 may be, for example, an analog or digital sensor measuring the direction and speed of rotation of the propel motor 524.

As can be appreciated, the pump 502 functions to propel a flow of fluid through either a first supply line 512 or a second supply line 506 when the engine 504 operates, depending on the direction of rotation of the swashplate within the pump 502. The motor 524 is connected to a wheel or drum 527 of the vehicle and arranged to rotate the drum 527 when the vehicle is travelling. A brake 528, shown schematically, is arranged to arrest or stall motion of the drum 527 when actuated by an actuator 530. The brake actuator 530 shown in this embodiment is electronic and actuates the brake 528 causing friction to arrest motion of the drum 527, but other configurations may be used. A first pressure relief valve 522 fluidly connects the first supply line 512 to a drain or reservoir 508. Similarly, a second pressure relief valve 513 fluidly connects the second supply line 506 with the drain 508.

An electronic controller 532 is connected to the vehicle and arranged to receive information from various sensors on the vehicle, process that information, and issue commands to various actuators within the system during operation. In this alternate embodiment, the controller 532 is connected to a control input 534 via a control signal line 536. The control input 534, shown schematically, may be, for example, a lever moveable by the operator of the vehicle used to set a desired speed setting for the vehicle. The position of the control input 534 may be translated to a command signal through a sensor 538 associated with the control input 534. The control signal relayed to the controller 532 may be used to yield a desired signal for the swashplate that causes the vehicle to move at the desired speed and direction.

The sensor 518 is appropriately connected to the controller 532 via a motor feedback line 540 and arranged to receive an actual signal from the sensor 518 indicative of the direction and speed or rotation of the motor 524. The controller 532 is also arranged to issue commands operating the various actuators in the system 500. For example, a pump displacement command line 542 may connect the controller 532 with the actuator 516 operating the control lever 514. Similarly, a brake activation line 544 may connect the controller 532 with the brake actuator 530 such that, in the presence of an appropriate signal in the brake activation line 544, the brake 528 may be engaged to arrest or stall motion of the drum 527 relative to the vehicle. The controller 532 may also be arranged to send and receive a multitude of other parameters to and from the engine 504 via a multi-channel engine communication line 548. Such parameters may include, for example, various operating parameters of the engine 504 such as engine speed and fuelling, as well as other parameters relevant to the operational state of the engine 504, such as coolant temperature, oil temperature, air temperature, component fault codes, and so forth.

When the operator commands motion of the vehicle by displacing the control input 534, a command signal is relayed to the controller 532 via the command input line 536. This signal causes the pump actuator 516 to move the control lever 514 by an appropriate extent and direction to achieve a desired operational setting. The desired angle of the control lever 514, which translates into a desired signal for the swashplate of the pump 502, causes an appropriate flow of motive fluid through the motor 524, which results in rotation of the drum 527 achieving the desired travel speed of the vehicle. Operation of the direction and magnitude of displacement of the control lever 514, in this embodiment, is accomplished in an open loop fashion based on the command signal from the command input line 536.

Even though this drive arrangement works well under most conditions, certain conditions exist under which the vehicle may be prone to motion different from the commanded motion by the operator. As a further example, the actuator 516 controlling the control lever 514 of the pump 502 may become sluggish or stuck due to intrusion of debris or contamination. In such a situation, the actuator 516 may assume a position that is uncommanded by the operator of the vehicle, causing the swashplate of the pump 502 to move uncontrollably. When such a rare condition is present, the drum 527 may begin rotating faster or in the opposite direction than what was commanded by the operator. It is desirable to arrest or stall motion of the vehicle, when such a situation is present, by automatically applying the brake 528.

Figure 6:
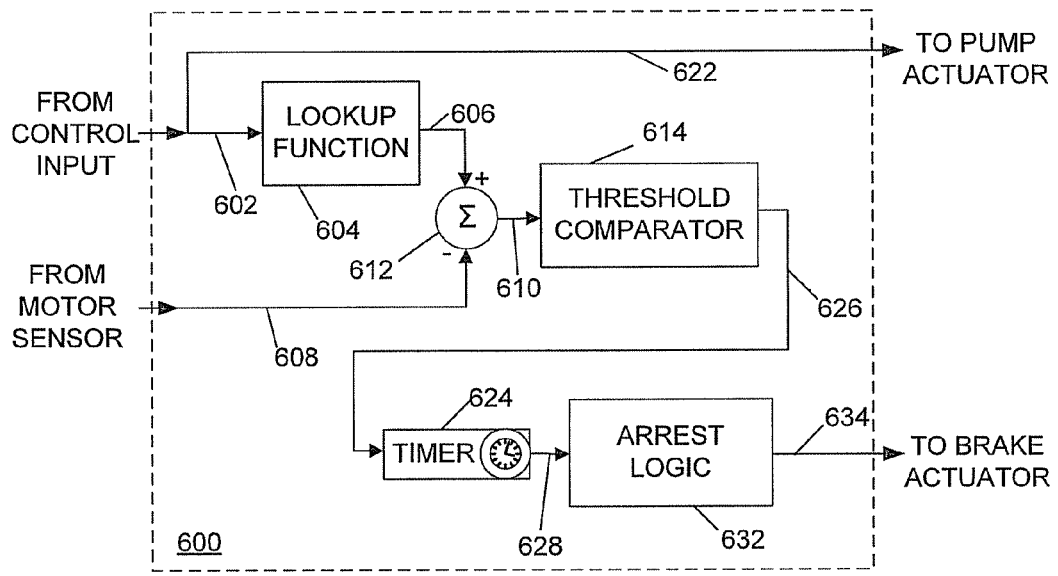
FIG. 6 is a block diagram for a control system in accordance with an alternate embodiment of the present disclosure.

A block diagram for a control system 600 capable of detecting and mitigating uncommanded motion of a hydrostatically driven vehicle is shown in FIG. 6. The control system 600, or an equivalent, may advantageously be coded within the controller 532 described in connection with FIG. 5 above, such that an uncommanded motion of the vehicle is identified during operation and arrested. The system 600 receives a command 602 for a desired vehicle motion or, equivalently, a desired direction and setting for the pump 502 from a displacement of the control input 534 by the operator. The command 602 may directly pass on to the pump actuator as a control signal 622, for example, to the actuator 516, and may also pass through a lookup function 604 where it may be correlated to a desired setting 606 for the pump 502. The desired setting 606 for the pump 502 may be a real or integer value having a sign indicative of direction, and a magnitude indicative of the speed or flow rate desired. Concurrently, a feedback or actual signal 608, for example, the direction and speed of the motor 524 as measured by the sensor 518 integrated, arrives at the controller 600.

The control system 600 may calculate a difference or error 610 between the desired signal 606 and actual signal 608 in a summing block 612, and compare the error to a set of threshold values in a comparator function 614. The error 610 is indicative of the difference between the desired signals 606 and the actual signals 608 of the swashplate within the pump 502, which is arranged to translate into the difference between the desired and actual speeds of the vehicle. The magnitude of this error is an indication of the discrepancy between the commanded and the actual motion of the vehicle.

The threshold comparator 614 may operate continuously during operation to monitor the error between the desired signal 606 and actual signal 608 for abnormal conditions or, in general, for excursions of error values that are indicative of a potential uncommanded motion. At times during operation when the error exceeds a threshold value or, more specifically, the absolute magnitude of the error exceeds a threshold, the threshold comparator 614 is arranged to activate a timer 624 through a threshold flag value 626. When the comparator 614 determines the error 610 to be above the threshold, the flag 626 is activated initializing the timer 624, which begins counting the time since the error exceeded the threshold by incrementing a time value. The timer 624 may increment the time value up to a predetermined time while the error is above the threshold and the flag 626 is active. If the error 610 exceeds the threshold for at least the predetermined time, meaning, the flag 626 is active during counting of the time value up to the predetermined time and the predetermined time is reached, the timer 624 will activate a fault flag 628. Activation of the fault flag 628 may be accomplished, for example, by setting the fault flag 628 value from zero to one.

Activation of the fault flag 628 operates to halt motion of the vehicle. The fault flag 628 activates an arresting function 632 that acts to automatically stop the vehicle by either activating the brakes 528 of the vehicle via a signal 634 to the brake actuator 530. The fault flag may additionally perform other functions, for example, alert the operator of the emergency condition, sound a buzzer or alarm, shift a transmission to neutral, turn off the engine of the vehicle, and so forth.

Figure 7:
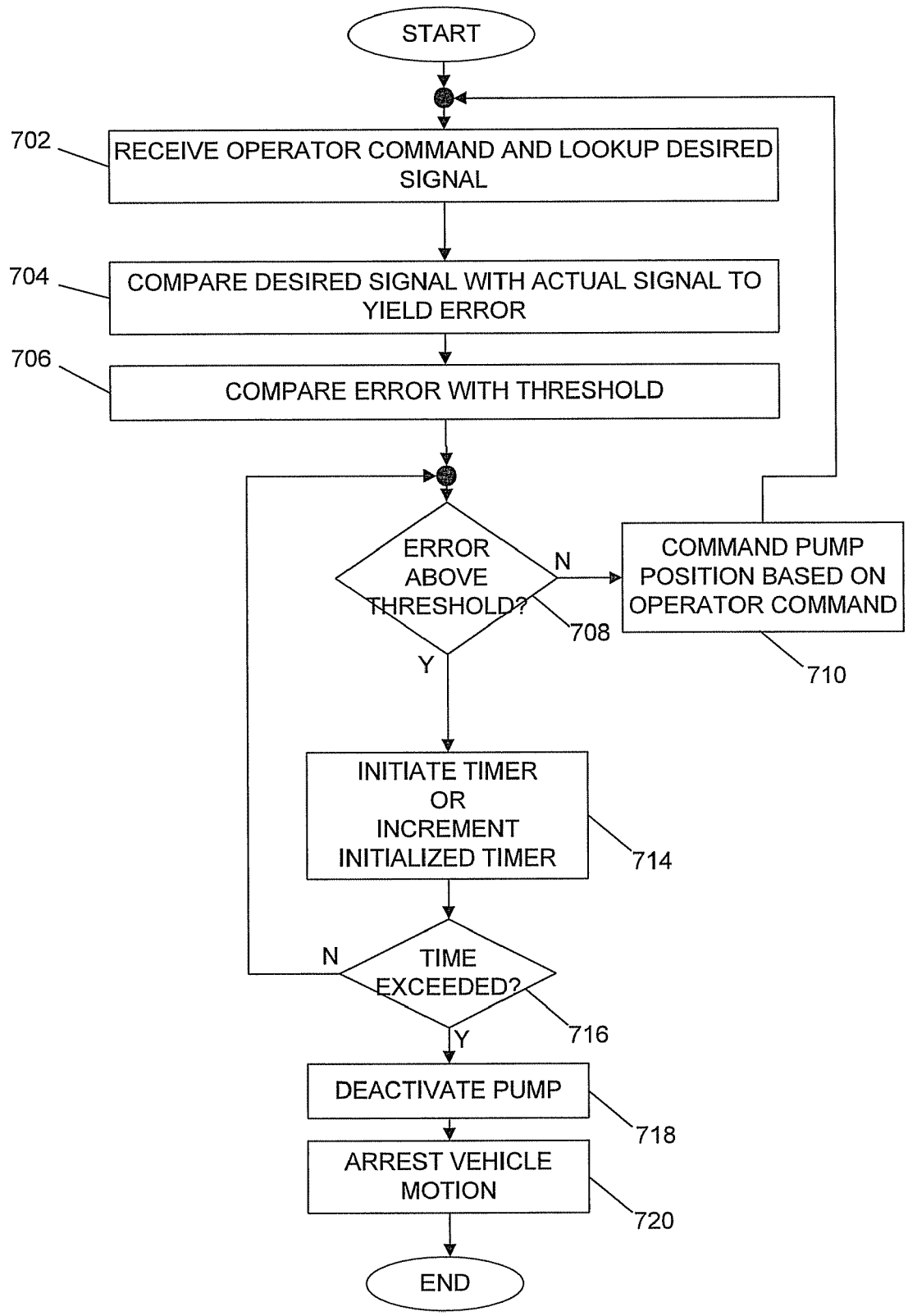
FIG. 7 is a flowchart for a method of operating a hydrostatically driven vehicle in accordance with an alternate embodiment of the present disclosure.

A flowchart for an alternative method of arresting uncommanded motion of a hydrostatically driven vehicle is shown in FIG. 7. A controller 532 integrated with the vehicle may receive an operator command and, based on the command, calculate or interpolate a desired signal indicative of, for example, a desired angle for the swashplate of the pump 502 driving the fluid operating the motors 524 of the vehicle at 702. The desired signal, or an equivalent parameter, is compared to an actual signal indicative of the direction and speed of rotation of the motor 524, as measured by an appropriately positioned sensor 518, to yield a difference or error at 704. The error is compared to a threshold at 706 for a determination at 708 of whether the error exceeds the threshold value.

If the error is determined to be below the threshold at 708, operation continues under a normal or first mode with the open loop command of the swashplate angle based on the operator command at 710. If, on the other hand, the error is determined to exceed the threshold at 708, operation continues under a second mode of operation by initiation of the timer 624 at 714. The timer 624 initiated at 714 may be, for example, an incremental timer counting up to a predetermined time threshold or limit. A determination whether the time threshold or limit has been reached at 716 operates to increment the timer as long as the error is still above the threshold at 708. The timer 624 continues to count the time since the error was determined to be above the threshold and while the error is still present. When the timer has reached the time limit at 716, and while the error is still above the threshold at 708, the pump controller is deactivated at 718 and motion of the vehicle is arrested or stopped at 720.

INDUSTRIAL APPLICABILITY

The present disclosure is applicable to hydrostatically driven vehicles having electronic controllers capable of operating the displacement of the propel pump or pumps associated with the vehicles. Uncommanded motion of the vehicle may occur under some circumstances. Embodiments described herein are suited for detecting uncommanded motion of the vehicle, for example, motion of the vehicle in a speed other than the speed commanded or motion in a direction other than the direction commanded. Embodiments described may also advantageously be capable of arresting the motion of the vehicle and may alert the operator of a fault having occurred. Embodiments described herein are described for purposes of illustration in the methods and devices used to diagnose a condition of uncommanded motion as well as arrest motion of the vehicle if such a condition is present for more than a predetermined time limit. It should be understood that there are a number of alternative methods for stopping the vehicle as well as for controlling a pump other than the ones described herein, and that any such equivalent methods are considered within the scope of the present disclosure.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. A method of operating a hydrostatically driven vehicle, the vehicle having a prime mover operating a variable displacement propel pump, a displacement of the pump varied based on an angle of a rotating swashplate included in the pump, a fluid flow impelled by the pump operating to transfer power to at least one propel motor, the propel motor operably connected to at least one wheel of the vehicle, the propel motor adapted to operate at a rotation speed and direction, motion of the vehicle being controlled by a control operated by a user, the method comprising:

sensing with a sensor to yield an actual signal at least one of (i) the angle of the rotating swashplate and (ii) the direction and speed of the propel motor;

relaying the actual signal to an electronic controller;

generating a control signal based on input from the control operated by the user;

determining a desired signal for the rotating swashplate based on the control signal;

comparing the actual signal with the desired signal in the electronic controller;

stalling motion of the at least one wheel of the vehicle when the actual signal differs from the desired signal by a predetermined extent and for a predetermined period;

initiating a timer when the actual signal differs from the desired signal; and stalling the motion of the at least one wheel when a time value incremented in the timer is at least equal to the predetermined period.

2. The method of claim 1, wherein comparing the actual signal with the desired signal includes calculating a difference between the desired signal and the actual signal, and comparing the difference to a threshold value.

3. The method of claim 1, wherein determining the desired signal is accomplished by a lookup function correlating the control signal to the desired signal.

4. The method of claim 1, further including disabling a controller operating to change the angle of the rotating swashplate included in the pump when the actual signal differs from the desired signal by the predetermined extent and for the predetermined period.

5. The method of claim 1, wherein stalling motion of the at least one wheel of the vehicle includes causing a braking mechanism to be applied for stalling motion of the at least one wheel of the vehicle when the actual signal differs from the desired signal by the predetermined extent and for the predetermined period.

6. The method of claim 1, further including activating a fault flag when the actual signal differs from the desired signal by a predetermined extent and for a predetermined period.

7. A hydrostatically driven vehicle comprising:

at least one wheel;

at least one propel motor connected to said at least one wheel, said at least one propel motor operating at a motor speed and along a motor direction;

a variable displacement pump, said pump being adapted to circulate a flow of propel fluid at a flow rate through said motor, the pump including a rotating swashplate having an axis of rotation, said swashplate being adapted to operate at selective angles with respect to said axis of rotation, said angle of the swashplate dictating said flow rate of the propel fluid, the flow rate of the propel fluid propelling the vehicle at a travel speed;

a control device adapted to change said angle of the swashplate;

an electronic controller;

a system sensor disposed to measure at least one of said angle at which the swashplate operates and said motor speed and direction, the system sensor operably connected to said electronic controller and adapted to relay an actual signal to said controller during operation of the vehicle;

a control sensor disposed to measure a displacement of said control device, said control sensor operably connected to the electronic controller and adapted to relay a desired signal to said controller during operation of the vehicle;

the electronic controller adapted to receive said actual signal and said desired signal, said electronic controller being adapted to:

calculate a difference between the actual signal and the desired signal;

compare the difference with a threshold value;

initiate a timer when the difference exceeds the threshold value;

increment a time value with the timer while the difference exceeds the threshold value;

compare the time value with a predetermined time limit; and arrest motion of the vehicle when the time value is at least equal to the predetermined time limit and the difference exceeds the threshold value.

8. The hydrostatically driven vehicle of claim 7, wherein the electronic controller includes a lookup function, the lookup function transforming a control signal from the control sensor to the desired signal.

9. The hydrostatically driven vehicle of claim 7, further including a brake disposed to halt rotation of the at least one wheel with respect to the vehicle, and an actuator adapted to operate the brake.

10. The hydrostatically driven vehicle of claim 9, wherein the actuator adapted to operate the brake is in operable communication with the electronic controller, wherein the electronic controller is further adapted to engage the brake when the time value is at least equal to the predetermined time limit and the difference exceeds the threshold value.

11. The hydrostatically driven vehicle of claim 7, further comprising a pump actuator adapted to change the angle of the swashplate.

12. The hydrostatically driven vehicle of claim 11, wherein the electronic controller is adapted to generate adjustment commands and the pump actuator is responsive to said adjustment commands from the electronic controller.

13. The hydrostatically driven vehicle of claim 12, wherein the electronic controller is adapted to generate said adjustment commands based upon the calculated difference between the angle signal and the desired angle signal.

* * * * *

UNITED STATES PATENT AND TRADEMARK OFFICE
CERTIFICATE OF CORRECTION

| | | |
|---|---|---|
| PATENT NO. | : 8,020,659 B2 | Page 1 of 1 |
| APPLICATION NO. | : 11/946677 | |
| DATED | : September 20, 2011 | |
| INVENTOR(S) | : Schultz et al. | |

It is certified that error appears in the above-identified patent and that said Letters Patent is hereby corrected as shown below:

Title Page, Col. 1, Item 75, (Inventors), line 1, delete "Eric J Schultz," and insert -- Eric J. Schultz, --.

Signed and Sealed this
Twenty-first Day of July, 2015

Michelle K. Lee
*Director of the United States Patent and Trademark Office*